F. M. Gibson.
Spoke Socket.
Patented Feb. 5, 1861.

No. 31,309.

Witnesses
F. B. Hale Jr
R. H. Eddy

Inventor
F. M. Gibson

UNITED STATES PATENT OFFICE.

F. M. GIBSON, OF CHELSEA, MASSACHUSETTS.

JOINT OF FELLIES IN CARRIAGE-WHEELS.

Specification of Letters Patent No. 31,309, dated February 5, 1861.

*To all whom it may concern:*

Be it known that I, FREDERIC M. GIBSON, of Chelsea, in the county of Suffolk and State of Massachusetts, have invented a new and useful or Improved Carriage-Felly-Joint Supporter; and I do hereby declare the same to be fully described in the following specification and illustrated in the accompanying drawings, of which—

Figure 1:
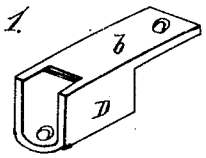
Figure 2:
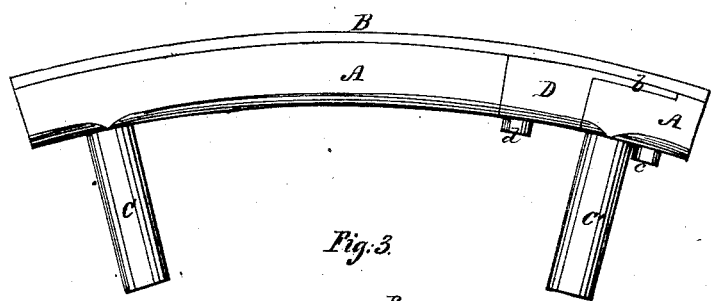

Figure 1, is a perspective view of it. Fig. 2, a side view; and Fig. 3, a longitudinal section of it as applied to the joint and spoke mortise of a felly.

Figure 4:
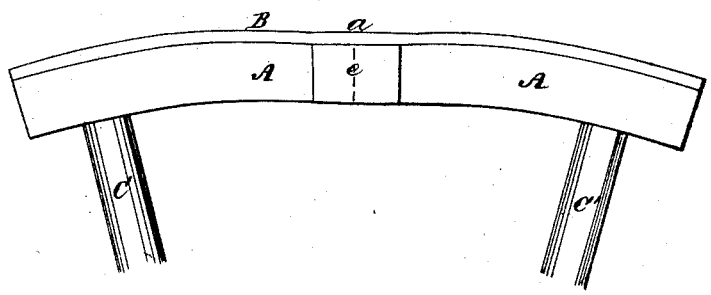

The common felly joint connection as usually made consists simply of a metallic collar within which the two ends of the felly are inserted. It is generally arranged midway between two adjacent spokes. The objection to it, is, that it renders the wheel liable to a change in form which, while the wheel may be in use will, sooner or later, be occasioned by blows on the tire, at or near the junction of the two ends of the felly, that is, the felly and the tire become bent inward as shown at, *a*, in Fig. 4, wherein, A, denotes the felly; B, the tire; C, C', two of the spokes, and, *e*, the joint supporter or connection of a carriage wheel.

Figure 3:
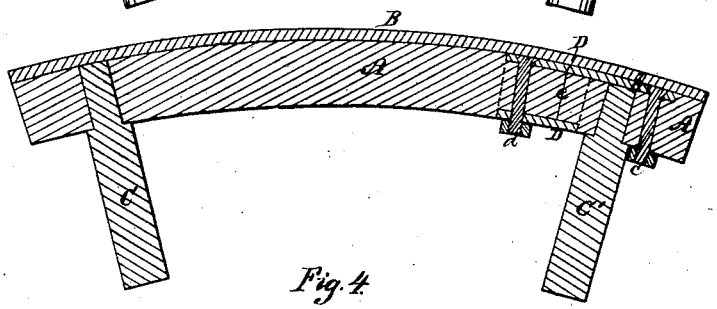

The object of my invention or improvement is to prevent this breaking or bending down of the wheel felly, when its ends are jointed, and for this purpose, I construct the joint connection, D, with a tongue or branch, *b*, extending from it as shown in Figs. 1, 2 and 3. I also so arrange the felly joint, *e*, that when the supporter, D, is placed thereon or so as to encompass the same, it may not only be close to a spoke C', as represented in Figs. 2, and 3, but have the tongue or part, *b*, lapping over the spoke mortise and tenon and the outer periphery of the felly and extending between the latter and the tire, B. A screw bolt, *c*, should be passed down through the tongue, *b*, and the felly. Another such bolt, *d*, should also be passed down through the felly and the socket piece D, and so as to be on one side of the felly joint, *e*, while the bolt, *c*, is on the opposite side thereof. By such a construction and application of the felly joint supporter, the tongue, *b*, not only operates to prevent the inward bending of the tire and felly at the joint of the latter, but with the socket D and the bolts *c*, *d*, is caused to hold the two parts of the felly in close connection or to prevent them from separating or being drawn out of the socket. Thus, should the tire get off the wheel while the latter may be running, my improved joint supporter will prevent the felly from being drawn out of the socket, D, and thus save the wheel from breakage and the bad consequences that might follow. As the end of a spoke will abut against the tongue, *b*, the latter and of course the socket, D, will be directly supported by the spoke. Consequently, under such circumstances, there can be no bending inward of the felly and tire, such as is exhibited at, *a*, in Fig. 4.

I claim—

1. The improved felly joint supporter as constructed with the tongue or projection, *b*, arranged with respect to the socket piece, D, substantially as specified.

2. The above specified arrangement and application of the felly supporter, D, its tongue, *b*, a spoke, C', the felly, A, its joint, *e*, and the tire B, the whole being to operate in manner and for the objects as specified.

F. M. GIBSON.

Witnesses:
K. H. EDDY,
F. P. HALE, Jr.